(12) United States Patent
Zhu et al.

(10) Patent No.: US 7,463,644 B2
(45) Date of Patent: Dec. 9, 2008

(54) SELF-CONFIGURING PHYSICAL CARRIER SENSING THRESHOLD ADAPTATION

(75) Inventors: Jing Zhu, Hillsboro, OR (US); Xingang Guo, Portland, OR (US); W. Steven Conner, Hillsboro, OR (US); Liuyang Lily Yang, Portland, OR (US); Mousumi M. Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 961 days.

(21) Appl. No.: 10/816,434

(22) Filed: Mar. 31, 2004

(65) Prior Publication Data
US 2005/0129051 A1    Jun. 16, 2005

Related U.S. Application Data

(60) Provisional application No. 60/528,998, filed on Dec. 11, 2003.

(51) Int. Cl.
*H04L 12/413* (2006.01)
(52) U.S. Cl. ............... 370/445; 370/437; 370/455; 370/463; 370/349; 455/134; 455/135
(58) Field of Classification Search ............... 370/445, 370/463, 437, 455, 343, 349, 333; 455/134, 455/135
See application file for complete search history.

(56) References Cited

U.S. PATENT DOCUMENTS

| | | | | |
|---|---|---|---|---|
| 5,220,564 A | * | 6/1993 | Tuch et al. | 370/338 |
| 5,428,629 A | * | 6/1995 | Gutman et al. | 714/758 |
| 5,553,316 A | * | 9/1996 | Diepstraten et al. | 370/445 |
| 5,960,005 A | * | 9/1999 | Moteki et al. | 370/496 |
| 6,157,616 A | * | 12/2000 | Whitehead | 370/252 |
| 6,911,948 B2 | * | 6/2005 | Foore et al. | 343/754 |
| 7,039,038 B2 | * | 5/2006 | Shoemake | 370/349 |
| 7,076,274 B2 | * | 7/2006 | Jollota et al. | 455/561 |
| 7,321,614 B2 | * | 1/2008 | Jacobsen et al. | 375/221 |

OTHER PUBLICATIONS

Office Action dated Mar. 13, 2008 for pending U.S. Appl. No. 10/879,766.

* cited by examiner

*Primary Examiner*—Ricky Ngo
*Assistant Examiner*—Kibrom T Hailu
(74) *Attorney, Agent, or Firm*—Blakely, Sokoloff, Taylor & Zafman LLP

(57) ABSTRACT

Apparatuses and methods for dynamically adjusting carrier sensing threshold levels in a wireless, such as CSMA, system. A station may use the carrier sensing measurement made in normal CSMA operation to determine a threshold level for the local station, and transmit the determined level to other stations in the system. The station also receives similar information from other stations in the system and determines, based at least in part on the information received and the local determined threshold level, an optimal carrier sensing threshold level.

23 Claims, 6 Drawing Sheets

SELF-CONFIGURING PHYSICAL CARRIER SENSING THRESHOLD ADAPTATION

This Application claims the benefit of U.S. Provisional Application No. 60/528,998, filed Dec. 11, 2003.

FIELD

Embodiments of the invention relate to wireless network throughput, and specifically to adjusting a carrier sensing threshold.

BACKGROUND

In carrier sensing multiple access/collision avoidance (CSMA/CA) based wireless networks such as the Institute of Electrical and Electronics Engineers (IEEE) standard 802.11 networks, a transmitter relies on carrier sensing to determine if the air medium is available so as to avoid interference. With carrier sensing, a station samples the energy level in the air before starting a packet transmission, and a transmission is only started if the reading is below a threshold $P_{CS}$, also called the physical carrier sensing (PCS) threshold. Because network characteristics such as topology, propagation, environment, background noise, etc., affect the energy level sample a station will measure, the choice of a PCS threshold that will enable CSMA to provide its best performance is not a trivial task. Moreover, these characteristics may change over time.

Unlike a wired LAN such as Ethernet, the transmission medium is not shared by the entire network in a wireless LAN. Rather, there exist multiple overlapping neighborhoods where the medium must be shared via contention. Moreover, modern wireless transceivers are designed to successfully receive packet transmissions, even in the presence of interference. The fundamental factor that determines whether a packet can be successfully received by a receiver is a signal to noise ratio (SNR), and specifically the signal to noise plus interference ratio (SNIR) at the receiver. If the signal that a device is attempting to receive has sufficiently more energy than the background noise and interference to be distinguishable over the background noise and interference, successful packet reception can occur even in the presence of interference. Thus, the goal of PCS in CSMA is to prevent simultaneous transmissions that will lead to packet collisions, while maximizing spatial reuse by permitting simultaneous transmissions that will not violate receiver SNIR requirements.

Current 802.11 networks typically operate with a physical carrier sensing scheme configured with a fixed threshold. The fixed threshold is typically very low, such that even a communication between network nodes spatially remote to the station in question would generate strong enough energy to make the station withhold its transmission. As a result, virtually no spatial reuse is allowed. Furthermore, the fixed threshold cannot be dynamically tuned according to different environments and as condition changes in the network. As wireless networks are deployed at higher densities and/or in multi-hop mesh topologies, the potential for spatial reuse increases. However, current PCS schemes with fixed threshold limit the ability to make full use of spatial capacity in these dense wireless network scenarios.

Other sensing schemes have been developed to improve system throughput. For example, virtual carrier sensing (VCS) schemes are also used in wireless networks. With VCS, a station maintains a NAV (Network Allocation Vector) that indicates the period(s) during which the air medium is reserved by other stations. This informs the station when NOT to transmit. When contending for the medium, a station broadcasts its intended transmission period. Each station that receives the broadcast updates its NAV. Thus, VCS requires participating stations to be able to receive and decode the broadcast frames. Unfortunately, this requirement (e.g. through RTS/CTS handshaking) cannot be guaranteed in most dense wireless networks including mesh networks.

BRIEF DESCRIPTION OF THE DRAWINGS

The description of embodiments of the invention includes various illustrations by way of example, and not by way of limitation in the figures and accompanying drawings, in which like reference numerals refer to similar elements.

FIG. 6b is one example of simulation results of throughput versus time for the simulation of FIG. 6a.

FIG. 7b is one example of simulation results of dynamic threshold level versus time for the simulation of FIG. 7a.

DETAILED DESCRIPTION

Methods and apparatuses are described with reference to dynamic carrier sensing threshold adaptation in a carrier sensing system. A carrier sensing threshold may be adjusted to adapt to changes in the transmit environment.

Figure 1:
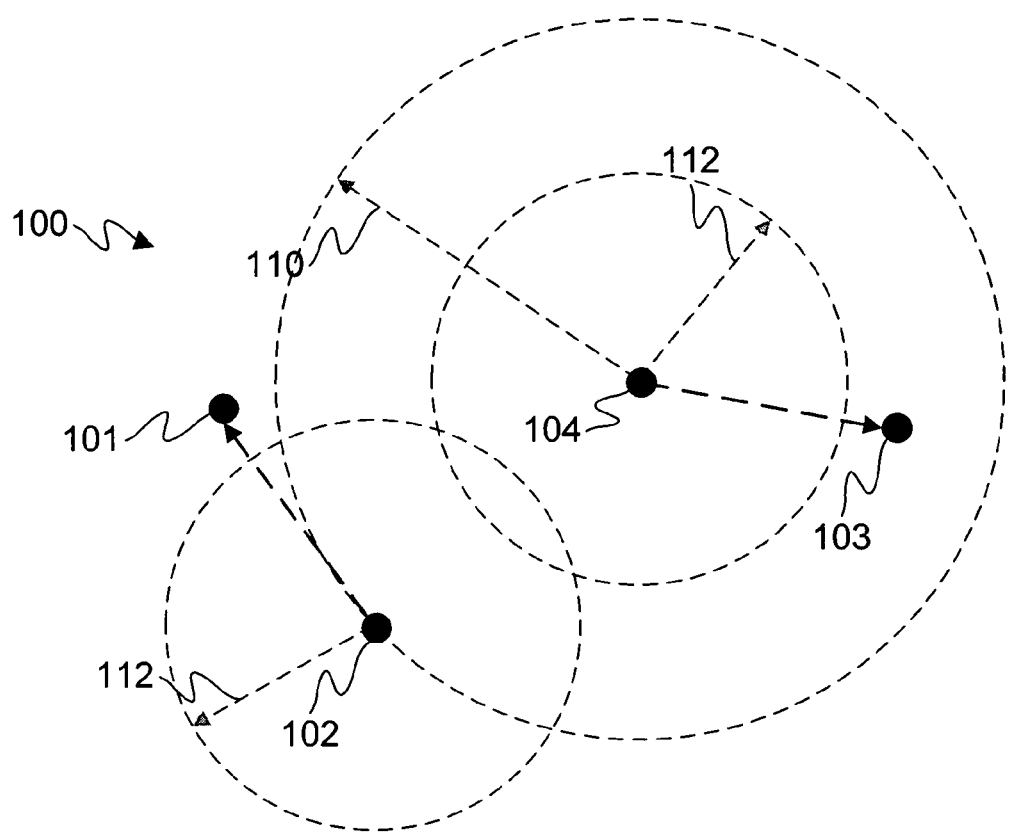
FIG. 1 is one embodiment of links between elements of a network.

FIG. 1 is one embodiment of links between elements of a network. Specifically shown are links between node 101 and node 102, and node 103 and node 104, over which the various nodes may communicate to each other. However, note that in a wireless network a network element will generate a signal to transmit to an intended node, which may also be detected by unintended receivers. The effect of receiving the signal at the unintended receiver may be that communication at the unintended receiver is disrupted. For example, a signal transmitted by node 102 to intended receiver node 101 may interfere with the ability of node 104 to successfully transmit a communication to node 103. Interference may thus limit the ability of elements of a system to communicate with each other.

The characteristics of the physical layer of the network elements will cause limitations on what may be considered to be a tolerable level of interference over which a receiver will be able to successfully receive communications. In a CSMA/CA (carrier sensing multiple access/collision avoidance) system, elements of the network typically determine a signal to noise ratio (SNR) of a link prior to transmission over the link. Specifically a signal to noise plus interference ratio (SNIR) may be used to account for other transmissions within the same transmit space. If the level of interference on the link is below a threshold, the node will determine that transmission is permissible, whereas if the interference level is above the threshold, the node may be required to back off and wait prior to transmission. As part of the process of determining whether transmission is permissible, a node will typically make a measurement referred to as carrier sense, or CS. The CS is the fundamental radio channel measurement made prior to transmission to determine if collision will be avoided. Various schemes, for example, virtual CS (VCS), may be based off the CS. To distinguish possible various other schemes for determining the ability to transmit, the term physical carrier sense (PCS) will be used herein to refer to the fundamental radio channel measurement.

Note that system 100 is shown with nodes 101-104 in various locations with respect to each other. System 100 may be a mesh network, in which elements of the network are spread across a two dimensional space. In a mesh network elements may communicate with a neighboring node, and communication to non-neighboring nodes is generally accomplished by communicating to a neighbor, which communicates with another neighbor, etc., until the intended node is reached. System 100 may also be a chain network, with elements essentially linearly arranged, and each node communicates only with the two neighboring nodes, and communication to non-neighboring nodes occurs via relay from one neighboring node to another. Thus, element arrangement of system 100 is not limited to a particular configuration. In one embodiment, network 100 is an 802.11 compliant CSMA wireless local area network (WLAN).

Note that various situations may result in system 100 based upon the selection of a PCS threshold. In a first situation the threshold may be selected to be overly sensitive, causing CSMA to be too conservative. The conditions of a PCS threshold that is too sensitive is that CSMA will prevent simultaneous transmissions that would be permitted by the physical layer receiver characteristics. For example, suppose that PCS threshold 110 centered on node 104 represents a threshold level that is overly sensitive. It may be overly sensitive because a transmission from node 102 to node 101 would produce interference that would not disrupt a communication on the link between nodes 103 and 104, and yet transmission would be prevented because the interference is above a selected threshold 110. Thus, although successful communication on the link between nodes 103 and 104 is possible, when node 104 detects the signal strength of the transmission between nodes 101 and 102 above threshold 110, it is required to wait for the transmission medium to become available prior to communicating with node 104. To maximize system throughput, CSMA should permit the communication on the link between nodes 103 and 104, because the signal strength on the link would be acceptably high enough to distinguish the communication from interference resulting from the transmission on the link between nodes 101 and 102.

In a second situation the threshold may be selected to not be sensitive enough, causing CSMA to be overly aggressive. The conditions of a system with a PCS threshold that is not sensitive enough is that CSMA will allow transmission on links where communication will be disrupted by interference from other signals in the transmit space. Thus, the system will have an unacceptable incidence of collision. For example, consider a threshold 112 centered on nodes 102 and 104. Assume that threshold 112 represents a PCS threshold level that is not sufficiently sensitive. Suppose that nodes 103 and 104 initiate a communication on their link, and that the transmissions will interfere with the ability of nodes 101-102 to successfully engage in communication. Because threshold 112 is not sensitive enough, when node 102 performs carrier sensing, although it may detect interference from the link between nodes 103 and 104, the interference signal strength is lower than the threshold level. Thus, nodes 101 and 102 may attempt to engage in transmission, which will result in collision at receiving node 102. In this situation, system throughput may actually be improved by having nodes 101 and 102 back off and wait for transmission between nodes 103 and 104 to terminate prior to communicating.

In a third situation the PCS threshold level has the appropriate level of sensitivity, causing CSMA to result in maximum system throughput for system 100 by achieving maximal spatial reuse without permitting collision. Suppose now that threshold 112 represents an optimal threshold level, meaning it is characterized by permitting transmission where the interference levels at receiving nodes are acceptable to achieve successful transmission without collision, and by causing a node to back off from transmission where interference levels would be sufficient to disrupt successful communication. Note that optimal threshold may not necessarily mean an absolute optimum, and may not result in absolute spatial reuse. That is, consider a node (not shown) that is located somewhere between nodes 102 and 104. A transmission from node 102 to node 101 may disrupt communication at a node located between nodes 102 and 104, and yet not disrupt communication at node 104. Thus, the optimal threshold level will allow communication on the link between nodes 101 and 102, and yet may require a node between nodes 102 and 104 to back off.

In one embodiment system 100 is designed to utilize dynamic PCS threshold adaptation. In an ideal system, an optimal PCS threshold may be pre-selected for all elements of the network, and CSMA would maximize spatial reuse to maximize system throughput based on the pre-selected threshold. In a real system, no fixed PCS threshold can adequately match the system to every operating condition of the network. As shown above, when a PCS threshold is too sensitive, nodes will back off that should transmit. Also, when a PCS threshold is not sensitive enough, nodes will transmit that should back off. With system 100 able to dynamically monitor and adjust the PCS threshold, the threshold could be made to track changes in the operating environment of system 100. This would result in better system throughput.

Figure 2:
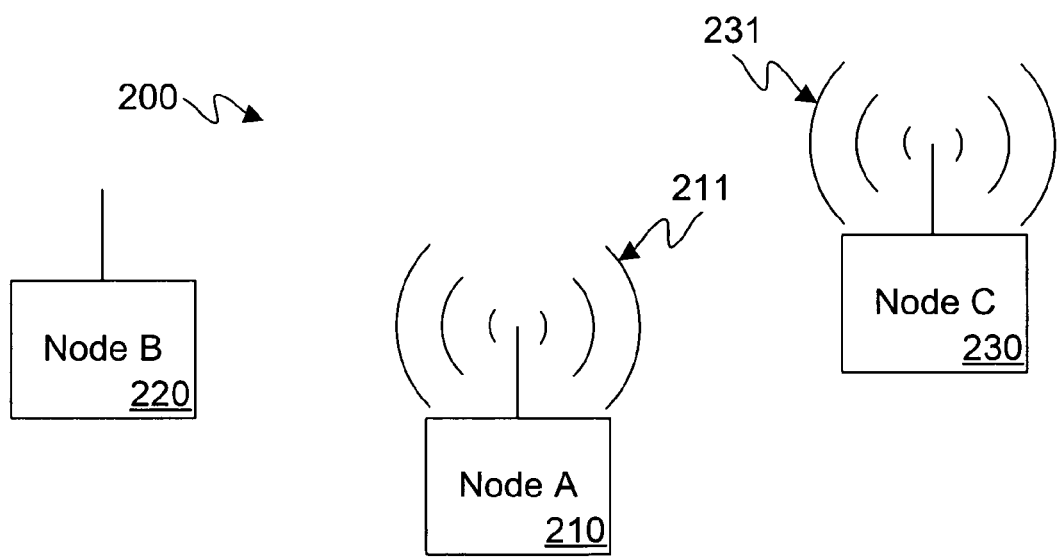
FIG. 2 is one embodiment of a network element transmitting adaptation information to other elements of a network.

FIG. 2 is one embodiment of a network element transmitting adaptation information to other elements of a network. System 200 includes node A 210, node C 230, and node B 220. Node A 210 is capable of measuring and/or determining local transmit/receive characteristics and/or statistics for a communication channel over which node A 210 will communicate. Characteristics may include, but are not limited to, an SNR of the communication channel, which may include SNIR, PCS threshold level, an adaptation indicator, etc. Node A 210 transmits information 211 related to the measured characteristics to other nodes in system 200. For example, node A 210 may broadcast the characteristics to neighboring nodes, or transmit to selected nodes, etc. A neighboring node is one within range of detecting and correctly receiving the signal having the information. Concurrently pending U.S. patent application Ser. No. 10/879,766, entitled "Method and Apparatus to Distribute Statistics in a Wireless Communication Network", and filed Jun. 28, 2004, discusses in more detail transmission of characteristics to other elements in a network.

In one embodiment node A 210 transmits information 211 for other nodes in the network to receive. Node C 230 may receive the information 211. Node C 230 may also transmit information 231, which would be received by node A 210. Each node measures its own characteristics for its communication channel and may determine an adaptation indicator for the local node. An adaptation indicator may include a variable, one or more flags, etc., to indicate that the node has determined its own threshold to need adjusting. It may then determine based on the information received from the neighboring node and its own adaptation indicator whether to adjust its local PCS threshold, and if it is to be adjusted, a value to which to adjust it. Thus, node A 210 will measure and determine statistics for node A 210 and transmit them to node C 230. Node A 210 will receive statistics transmitted by node C 230, and determine based at least in part on the information 231 received from node C 230 how to adjust the PCS threshold local to node A 210, if at all. Node C 230 will perform a similar process. In this way the setting of optimal PCS thresholds at the nodes of system 200 occurs in a distributed fashion, because each node individually makes a determination at its node. The local determinations provide system 200 with a global optimal performance based on the fact that each local node A 210 and C 230 will have a PCS threshold set for maximizing throughput. The throughput of the system at large will then be maximized.

The process above is described in terms of node A 210 and node C 230, but may also be applicable to node B 220. In one embodiment node B 220 has the ability to monitor its local characteristics and transmit the characteristics to other nodes in system 200. Node B 220 may then follow a similar process as described above in determining a local optimal PCS threshold.

In an alternate embodiment, both node A 210 and node C 230 may transmit information to a single node B 220. A single node for gathering and/or processing adaptation information may be referred to as a central monitoring node, or central node. Use of a central node means that some or all nodes in the system transmit information to the central node. Thus, rather than the purely distributive embodiment above, one node may be partially or wholly responsible for collecting information related to dynamic PCS threshold adaptation. For example, if node B 220 were a central node, node A 210 and node C 230 may transmit only to node B 220 rather than to each other. Central node B 220 may then process and/or relay the information to other nodes in system 200.

Central node B 220 may simply gather and transmit information for other nodes, or it may gather and perform some processing of information prior to sending a signal to the other nodes. For example, node B 220 as a central node may select a PCS threshold value for nodes in system 200, or determine a global PCS threshold for all neighboring nodes. Node B 220 may then transmit a message to cause the nodes in system 200 to adjust their PCS threshold, or simply transmit the value to the nodes. Alternatively, node B 220 may determine from among the information received, which values are within a specific range, or which are the lowest, etc., and relay such determined information to other nodes. Generally systems are designed to be homogenous in that all nodes share a common PCS threshold level.

Figure 3:
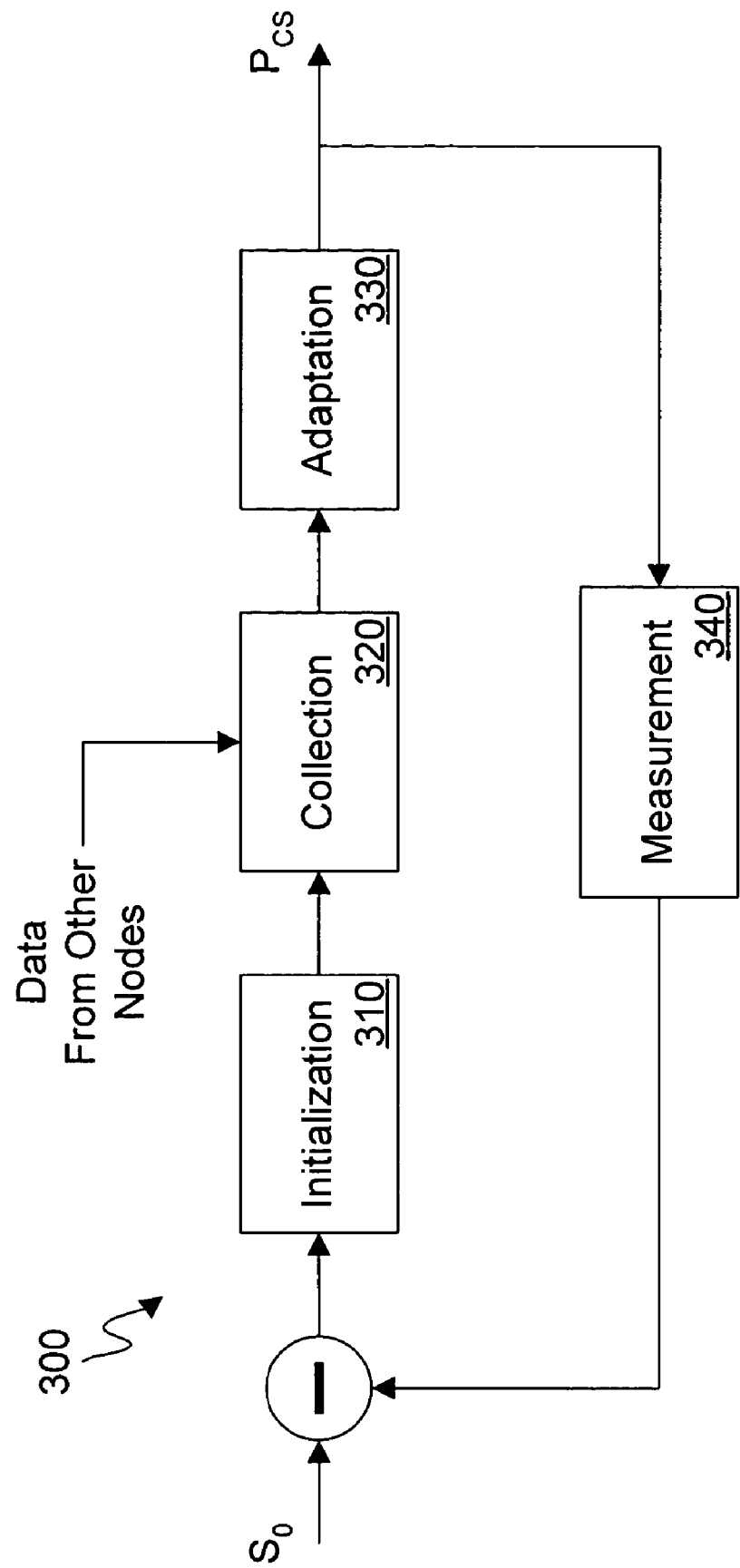
FIG. 3 is one embodiment of a block diagram of an adaptation loop.

FIG. 3 is one embodiment of a block diagram of an adaptation loop. Processes of adaptation loop 300 may be performed locally at each station in the system, or the process or equivalent may be performed at a central station. In another embodiment, certain processes are performed at the local station while other processes are performed at a central station.

Each station in the system is presumed to be able to perform local characteristic gathering, shown by measurement 340. This includes, but is not limited to determining an interference condition of a selected communication channel, determining local transmission limitations, etc. For example, in CSMA systems an SNIR measurement is made by a local station prior to transmission on a communication channel. This measurement is compared against a reference level $S_0$, such as a level specified by the physical layers of the station's transmission system.

From the data determined by measurement 340, a station determines at initialization 310 a local PCS threshold. The local PCS threshold level will account for the limitations of the physical layer in transmitting into the environment of the communication channel. Based on the characteristics determined for the communication channel and the physical layers of the station, an adaptation indicator $\xi$ may be determined. The adaptation indicator $\xi$, to be discussed in more detail below, is an indicator as to whether the local station should adjust its currently set PCS threshold. One embodiment of determining an adaptation indicator $\xi$ may be according to the following mathematical function:

$$\xi = \begin{cases} 2, & \bar{S} \geq S_0 + \delta \\ 1, \text{ if } & S_0 - \delta < \bar{S} < S_0 + \delta, \\ 0, & \bar{S} \leq S_0 - \delta \end{cases}$$

where $\bar{S}$ represents a measured value of the threshold, $S_0$ represents a reference value of the threshold, and $\delta$ is some value, e.g., 0.5 dB, 1.0 dB, 2.0 dB, which indicates the range of tolerance allowed for the threshold in the particular system implementation. Alternatively, the adaptation indicator $\xi$ may have different values, or values may correspond to different functions. It is also conceivable to use a pair of logical flags such as one to indicate that a change should take place, and a second to indicate whether the change will be to increase or decrease the value of the PCS threshold. The output of initialization 310 may include a local PCS value and an adaptation indicator $\xi$.

The station knows the local current PCS threshold and the determined adaptation indicator $\xi$, and further gathers characteristics from other stations in collection 320. Collection 320 represents the station receiving the characteristics of neighboring stations as shown by data from other stations being received into collection 320. This data may include a PCS threshold value and adaptation indicator determined by each station locally, and transmitted to the station for which adaptation loop 300 is being performed. The data may be received directly, as in a distributed adaptation system, or from a central station, as in a centralized network configuration.

Based on the information gathered for the local station as well as the other stations in the system, a determination may be made as to whether to adjust the local PCS threshold. The information may be processed in a centralized or distributed fashion to make the determination. In one embodiment the processing involves a simple lowest threshold determination from among the data gathered from the local station and the neighboring stations, as in the following mathematical functions:

$$\xi = \min(x, \xi)$$

$$P_C^{(min)} = \min(y, P_C^{(min)}).$$

where $\xi$ represents the adaptation indicator, min( ) is the minimum function, and $P_C^{(min)}$ represents the minimum PCS value, x represents the value of $\xi$ for other station(s) received in collection 320, and y represents the value of $P_C^{(min)}$ for other station(s) received in collection 320.

In this case a minimum value is determined and the PCS threshold is set to match the minimum value found. This is one method to maximize fairness. If a particular station in the system is operating under conditions of greater interference than other stations, its threshold may be required to be more sensitive in order to successfully complete transmissions. While neighboring stations may be able to support a less sensitive threshold, if the neighboring stations were to set their PCS thresholds to less sensitive values, the station requiring the more sensitive threshold due to its operating environment would be less likely able to transmit. In the case where all values are set to the same lowest value, all stations in the system will back off or transmit according to the same threshold. Thus, a station would not have a more aggressive neighbor that prevents it from transmitting. Other methods may include determining a value that is within a window, or closest to a certain value, etc.

Once a local optimal PCS threshold is determined, the PCS threshold is set in adaptation 330. In one embodiment the PCS threshold is value that may be set directly to a value. Alternatively, the PCS threshold may be adjustable only in steps. A combination may be used, where a PCS threshold value is determined, and the value set may be adjusted by some step $\delta$. One example of a possible mathematical function is:

$$P_{cs} = \begin{cases} P_{cs}^{(min)} + \delta, & (\xi = 2) \\ P_{cs}^{(min)}, & \text{if } (\xi = 1), \\ P_{cs}^{(min)} - \delta, & (\xi = 0) \end{cases}$$

where $P_{CS}$ represents the PCS threshold value, $P_C^{(min)}$ represents a minimum PCS threshold determine, $\delta$ represents an incremental step of PCS, and $\xi$ represents the adaptation indicator.

Note that each of the above equations represents a function for each individual station in the system. The function being performed for each station based on information received from other stations results in determining a global optimal value for the system that will result in maximum throughput based on PCS value for the system. This global optimal value will most often allow stations to transmit, and do so in a fair manner. Thus, every station will take maximum fair opportunities to transmit.

In one embodiment aspects of dynamic PCS adaptation are performed on a periodic basis. For example, the system may have some $\tau$ defined as a time period. At the beginning/end of each period $\tau$ the station may adjust its PCS threshold settings. The value of $\tau$ will depend upon the system, and may be, e.g., 0.5 sec, 1.0 sec, 2.0 sec, etc. Note that the setting of the PCS threshold in adaptation 330 is only one process in adaptation loop 300. Other parts of loop 300 may occur during the time interval, and may occur behind the scenes so as to be non-disruptive on system processing resources. Thus, one implementation would have collection 320 occur whenever a packet is received from other system nodes that includes adaptation characteristics. A determination may be made when the packet is received as to what the best value of $P_{CS}$ and $\xi$ should be. Determinations as to local measurements may be made periodically, (every $\tau$ seconds), or only when a communication is to take place with another station.

Figure 4:
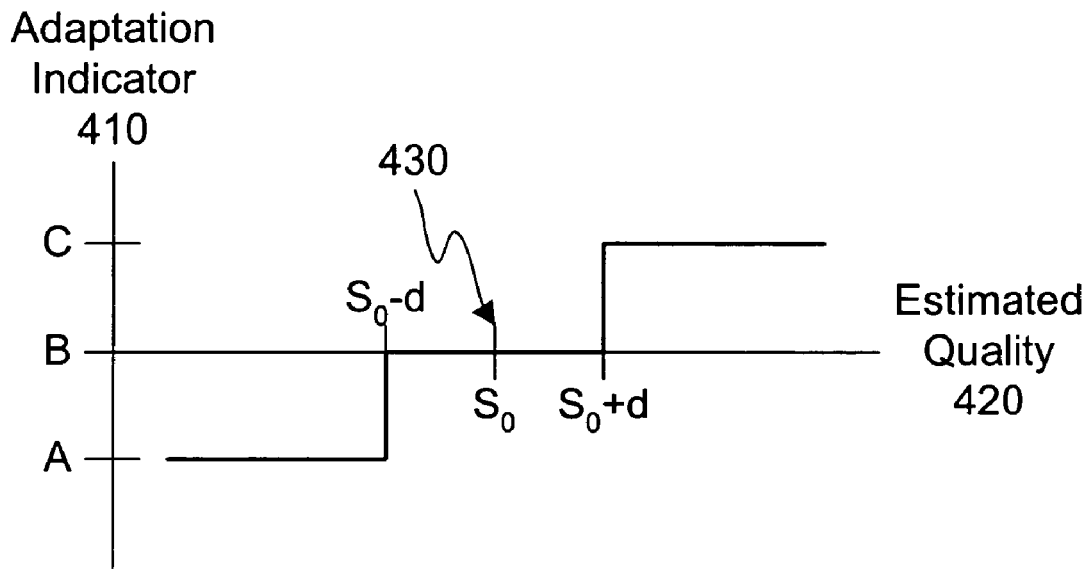
FIG. 4 is one embodiment of an adaptation indicator step function.

FIG. 4 is one embodiment of an adaptation indicator step function. In a system performing adaptive PCS threshold adjustment, a determination is made for each node in the system as to whether its current threshold is optimal for the node in the interference condition, or whether the threshold needs to be adjusted. This information is shared with neighboring nodes according to the techniques described above. Based upon the information from local measurements, and the information shared from neighboring nodes, the node may adjust its PCS threshold.

As shown in FIG. 4, an adaptation indicator 410 is assigned a value A, B, or C based on an estimated quality 420. One example of this is given by the equation, repeated from above:

$$\xi = \begin{cases} 2, & \overline{S} \geq S_0 + \delta \\ 1, & \text{if } S_0 - \delta < \overline{S} < S_0 + \delta \\ 0, & \overline{S} \leq S_0 - \delta \end{cases}$$

where $\xi$ represents adaptation indicator 410, $\overline{S}$ represents estimated quality 420, $S_0$ represents a reference threshold, and $\delta$ (or d) represents an incremental value.

Adaptation indicator 410 $\xi$ is set to a value of B if an estimated quality 420 $\overline{S}$ is within a range of acceptable estimated quality. The acceptable estimated quality range is some reference quality $S_0$ 430, plus or minus a factor d. The value of d is dependent upon the implementation desired, and can be determined based upon experimentation. For example, d may be 0.5 dB, 1.0 dB, 0.75 dB, etc. d may be selected to be a small enough or a large enough step to allow the system to keep a fine tune around $S_0$ 430, or allow a little more noise. This will depend on the capabilities of the system hardware, as well as the environment under which the system is operating.

The value of adaptation indicator 410 $\xi$ may be set to a value of C if estimated quality 420 $\overline{S}$ is above a threshold $S_0+d$. The value of adaptation indicator 410 $\xi$ may be set to a value of A if estimated quality 420 $\overline{S}$ is below a threshold $S_0-d$.

Figure 5:
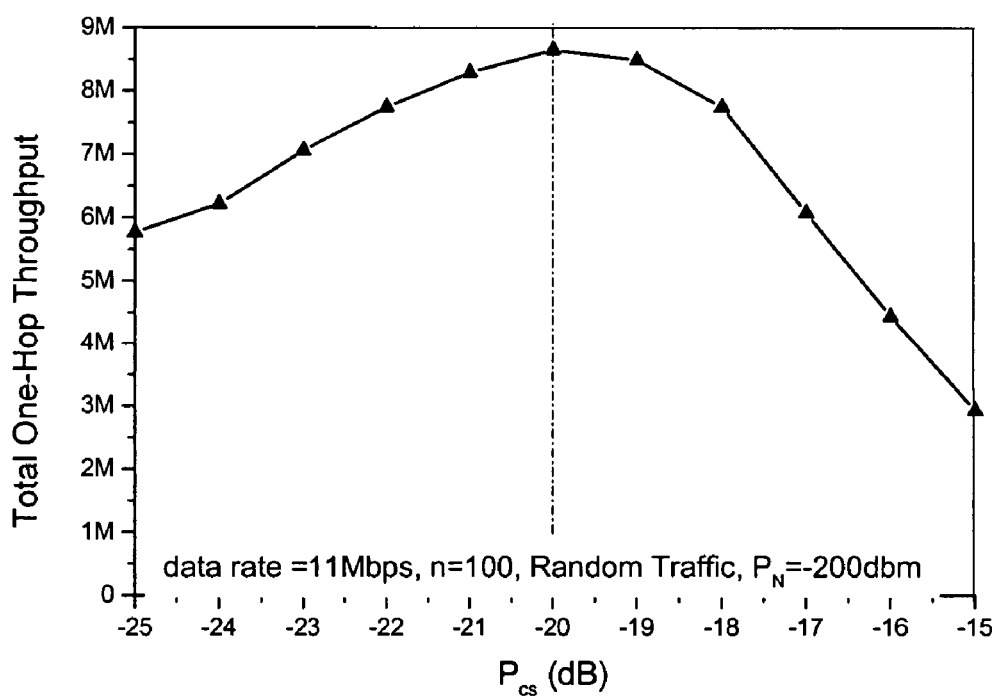
FIG. 5 is one example of simulation results of throughput versus threshold level for one embodiment of an adaptive PCS system.

FIG. 5 is one example of simulation results of throughput versus threshold level for one embodiment of an adaptive PCS system. The simulated adaptive PCS system consisted of a 10×10 homogenous 802.11 grid network operating according to embodiments of the invention described herein. Specifically, each network element could measure local PCS and local adaptation statistics and broadcast them to neighboring network elements. Each element in the network received the statistics from neighboring elements, and adjusted its local PCS threshold according to the most sensitive PCS threshold from among the neighboring network elements. The simulation in FIG. 5 has the further characteristics of an 11 Mbps data rate, a background noise value ($P_N$) of −200 dbm, and a γ (path loss exponent) of 2.5. The simulation shows a maximum throughput at a PCS threshold of −20 dB. The theoretical optimal PCS threshold for the system simulated in FIG. 5 is −21 dB. This shows that a system using dynamic, distributed PCS threshold adjustment is capable of tracking a theoretical optimal value quite closely.

Also note the difference in throughput the PCS threshold makes. A plus or minus 2 dB value drops the throughput by over 10%. The further away the PCS threshold is from the optimal value, the worse the results. Therefore, it is concluded that choosing the appropriate PCS threshold makes a significant difference in terms of throughput performance.

Figure 6A:
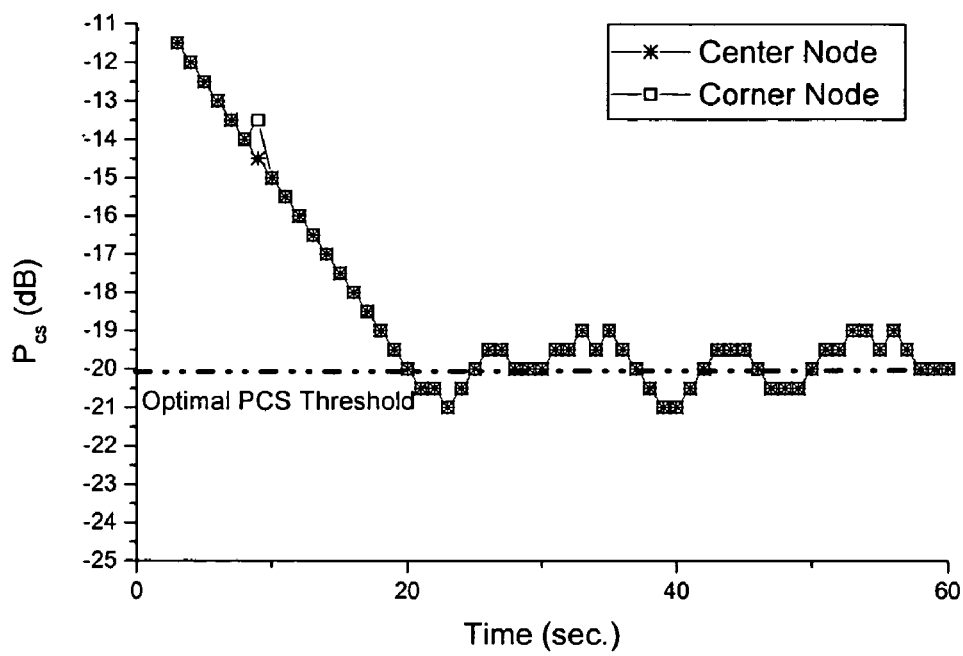
FIG. 6a is one example of results of dynamic threshold level versus time for a simulation of one embodiment of the invention.

FIG. 6a is one example of simulation results of dynamic threshold level versus time for one embodiment of an adaptive PCS system. The simulated system is the same system simulated in FIG. 5. In this example, the PCS threshold was started at an arbitrary value that was not very sensitive. The system was allowed to dynamically "find" an optimal PCS threshold for the system. It is important to note that in this simulation, the PCS value was updated at each element at one second intervals. It took less than 20 seconds from an arbitrarily insensitive PCS threshold for the system to achieve a system threshold within 1 dB of the optimal PCS threshold. The system then tracked the optimal threshold within 1 dB.

Figure 6B:
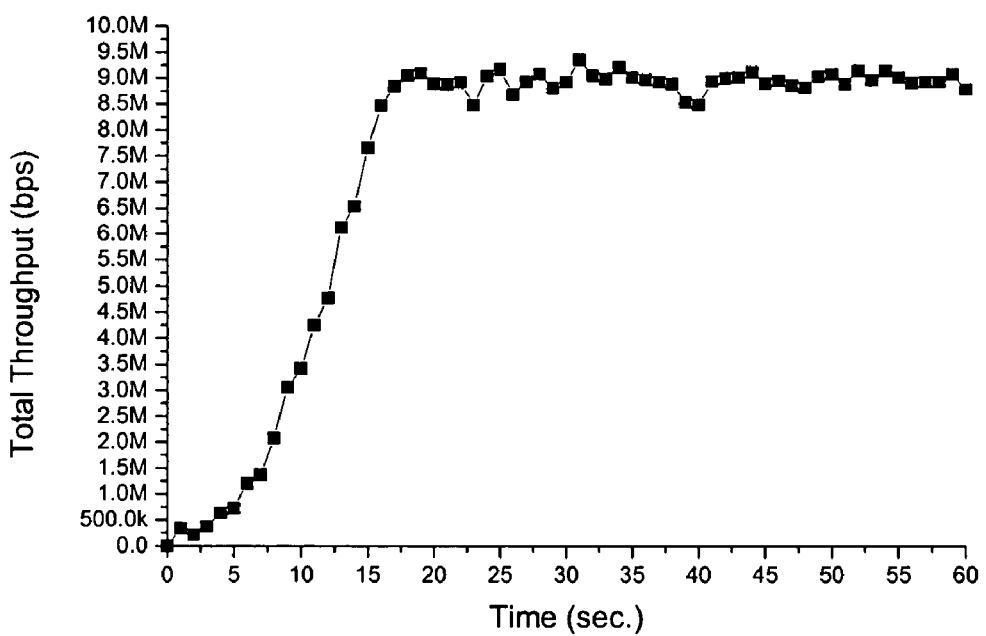

FIG. 6b is one example of simulation results of throughput versus time for the simulation of FIG. 6a. The results of this simulation show throughput over the same time interval of FIG. 6a. Throughput began at a very low value, but maximized as the system achieved the optimal PCS threshold. Note that the throughput, as with the PCS threshold of the above simulation reached a stable level. This again confirms a relationship between PCS threshold and system throughput.

Figure 7A:
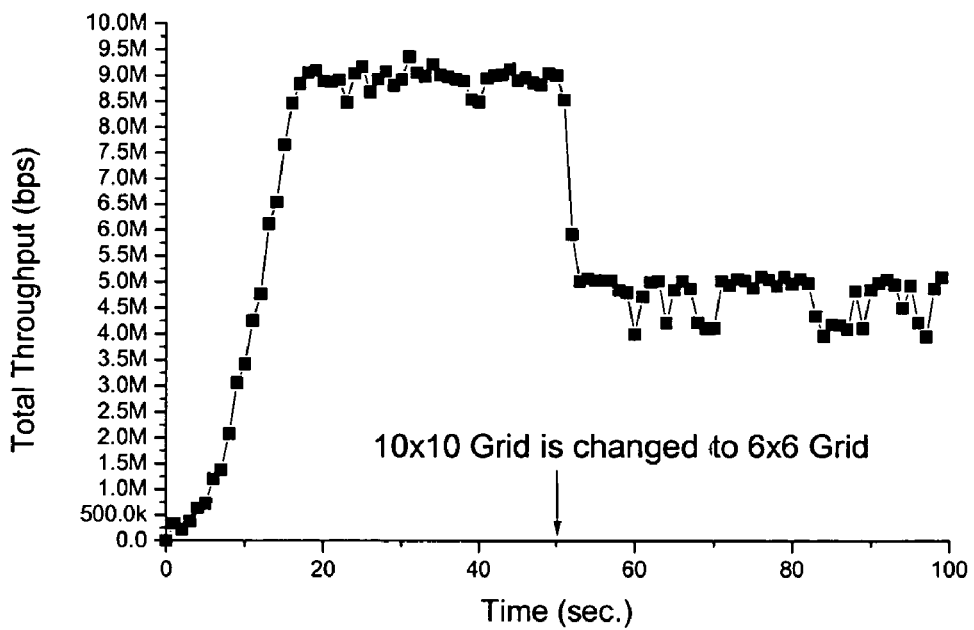
FIG. 7a is one example of simulation results of throughput versus time for one embodiment of an adaptive PCS threshold system.

FIG. 7a is one example of simulation results of throughput versus time for one embodiment of an adaptive PCS threshold system. Consider the system simulated in FIGS. 6a and 6b. To further illustrates the effect of adaptation, the effective topology of the simulated system is changed in the middle of the simulation period such that only stations in a 6×6 grid in the center of the 10×10 grid will continue to generate traffic, while all other stations stop after 50 seconds. FIG. 7a shows how the simulated system achieved a stable throughput level, and was then required to adapt. The total throughput decreases because of the reduced total number of active stations.

Figure 7B:
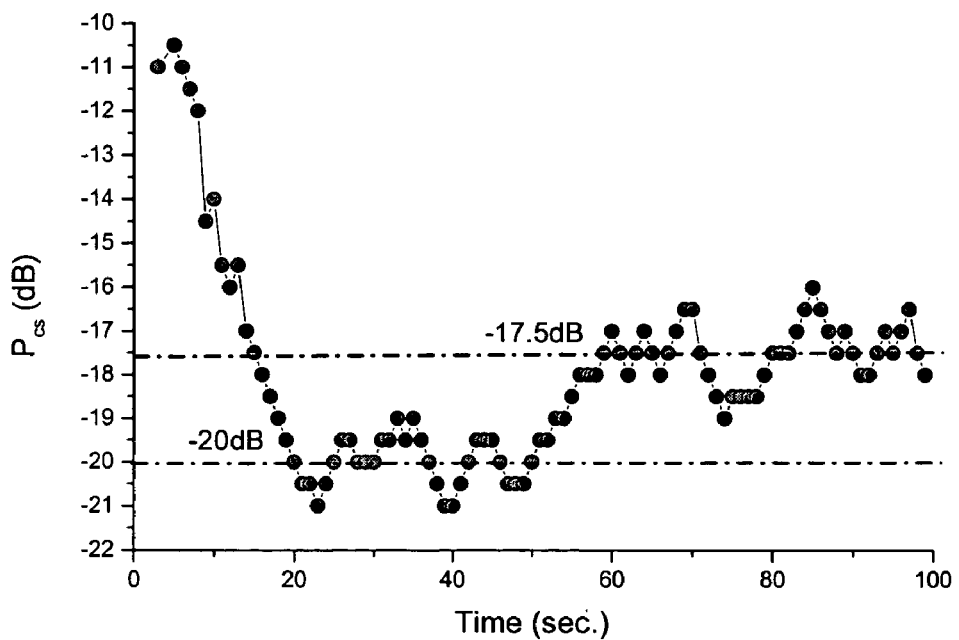

FIG. 7b is one example of results of dynamic threshold level versus time for the simulation of FIG. 7a. Just as the system achieved its optimal PCS threshold with the 10×10 grid, when the network topology was changed to the center 6×6 grid, the system had to achieve a new optimal PCS threshold level. The PCS converges to its new value of −17.5 dB.

Figure 8:
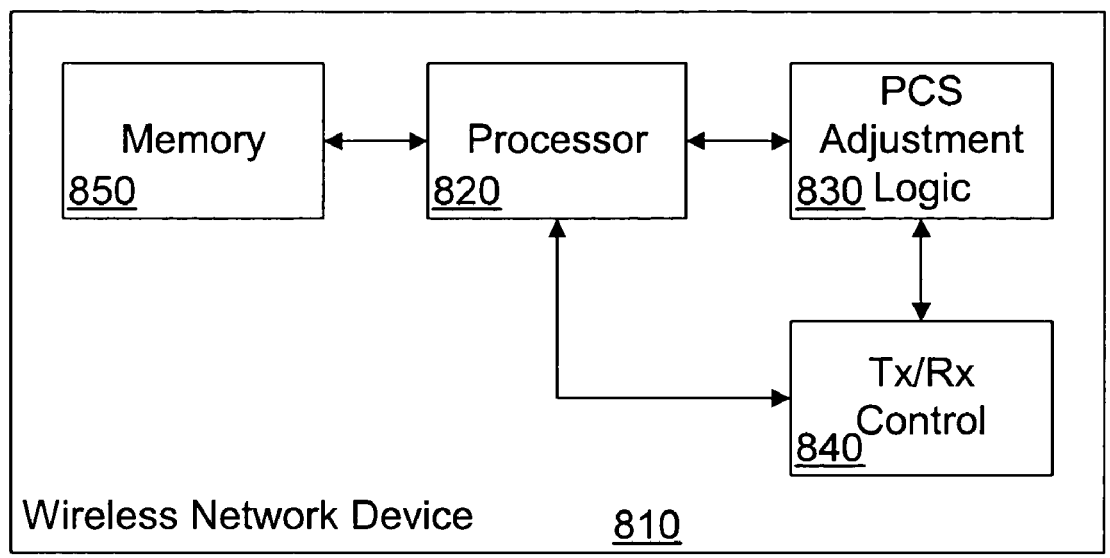
FIG. 8 is one embodiment of a block diagram of a device having circuit elements to perform dynamic PCS adaptation.

FIG. 8 is one embodiment of a block diagram of a device having circuit elements to perform dynamic PCS adaptation. Wireless electronic device 810 is an example of a device that may be part of a wireless network that performs according to the CSMA standard. Device 810 include processor 820 that may be an ARM-compliant processor by Intel Corporation of Santa Clara, Calif., a digital signal processor (DSP), or other type of microprocessor for use in wireless electronic systems. Processor 820 executes instructions and performs functions that may be considered to be processing, such as determining values, performing comparisons, searching, determining minimum values, etc. Processor 820 may receive instructions from memory 850. Processor 820 may also interchange data with memory 850 to manipulate the values of variables, or perform processing on certain data, etc.

Because wireless electronic device 810 operates an adaptive PCS scheme, device 810 includes some sort of PCS adjustment logic 830. PCS logic 830 may include the circuits that set the hardware PCS threshold level to its desired value. In one embodiment PCS logic 830 may be considered to be part of processor 820, and perform functions such as generating one or more signals to cause transmit/receive hardware to adjust the PCS threshold.

In another embodiment part or all of PCS logic 830 may be considered to be part of Tx/Rx control 840, which may include the hardware and/or circuits directly responsible for the PCS threshold level. Tx/Rx control 840 may interact with PCS logic 830 and/or processor 820 in the adaptation processes where the PCS threshold is adjusted, as well as in the measurement processes where characteristics data is gathered for device 810. Tx/Rx control 840 may include the logic and/or hardware to make a determination of the conditions of the communication channel and the physical layers of device 810.

Device 810 includes memory 850 for storing instructions and/or data. Memory 850 may include one or more of flash, synchronous dynamic random access memory (SDRAM), read-only memory (ROM), etc. The instructions/data stored in memory 850 may include instructions/data directed to performing dynamic PCS adaptation. These instructions/data may be stored on memory 850 from preprogramming of the memory device, or from loading instructions/data onto memory 850 from another article of manufacture. An article of manufacture refers herein to some medium capable of storing and/or transmitting digital content to a memory. For example, an article of manufacture may include a disk, whether magnetic, optical, electronic, etc., a transmission medium to transmit digital content, such as cables, wires, etc., or a portable memory device, such as memory cards, sticks, etc.

Reference herein to "one embodiment" or "an embodiment" means that a particular feature, structure or characteristic described in connection with the embodiment is included in at least one embodiment of the present invention. Thus, the appearance of phrases such as "in one embodiment," or "in another embodiment" describe various embodiments of the invention, and are not necessarily all referring to the same embodiment. Besides the embodiments described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

measuring a communication channel characteristic of a wireless communication channel for a local wireless network node of a network of nodes;

determining a local transmission threshold for the local wireless network node based on the measured communication channel characteristic, wherein the local transmission threshold includes a physical carrier sense threshold indicating a threshold level of interference that is tolerable for a physical layer of the local wireless network node, where interference sensed in the network by the local wireless network node exceeding the local transmission threshold causes the local wireless network node to back off from transmission;

receiving a transmission threshold from a remote network node, the received transmission threshold indicating a threshold level of interference that is tolerable for a physical layer of the remote network node, where interference sensed in the network by the remote network node exceeding the received transmission threshold causes the remote network node to back off from transmission; and adjusting automatically the hardware settings of the physical layer of the local wireless network node based on the local transmission threshold and the received transmission threshold, including selecting the lower transmission threshold of the local transmission threshold and the received transmission threshold, and adjusting the hardware settings to make the wireless network node responsive to the selected transmission threshold, where interference exceeding the selected transmission threshold causes the local wireless network node to back off from transmission on the wireless communication channel.

2. A method according to claim 1, wherein measuring the communication channel characteristic comprises determining a signal to noise-plus-interference ratio (SNIR) for the communication channel for the local wireless network node.

3. A method according to claim 1, further comprising transmitting the determined local transmission threshold to another node in the wireless network.

4. A method according to claim 1, wherein adjusting the hardware settings of the local wireless network node is performed at periodic intervals, and the hardware settings remain constant throughout the interval.

5. A method according to claim 1, wherein receiving the transmission threshold from the remote network node comprises receiving a transmission threshold for multiple neighboring network nodes, and adjusting automatically the hardware settings of the local wireless network node based on the local transmission threshold and the received transmission threshold comprises adjusting the hardware settings of the local wireless network node based on the local transmission threshold and all received transmission thresholds.

6. A network element of a wireless network comprising:
a receiver to receive a carrier sensing signal sent from the network element to determine a physical carrier sense (PCS) characteristic of the network element, and to receive from a neighboring network element a signal indicating a PCS characteristic of the neighboring network element, where the received PCS characteristic of the neighboring network element indicates a threshold level of interference that is tolerable for a physical layer of the neighboring network element, where interference in the wireless network exceeding the received PCS characteristic of the neighboring network element causes the neighboring network element to back off from transmission;
a transmitter to transmit a PCS characteristic determined for the network element;
a processor coupled with the receiver and the transmitter, to process the received carrier sensing signal and determine a PCS characteristic for the network element based at least in part on the signal to noise ratio of the received carrier sensing signal, where the determined PCS characteristic of the network element indicates a threshold level of interference that is tolerable for a physical layer of the network element, where interference in the wireless network exceeding the determined PCS characteristic of the network element causes the network element to back off from transmission, and the processor to further determine an updated PCS characteristic for the network element based at least in part on the determined PCS characteristic for the network element and the received PCS characteristic of the neighboring network element, including determining which of the determined PCS characteristic for the network element or the received PCS characteristic for the neighboring network element is lower in value and selecting the lower value of the PCS characteristics as a value of the updated PCS characteristic; and
hardware control circuits to set the hardware PCS threshold of the network element to the value of the updated PCS characteristic, where interference in the wireless network exceeding the updated PCS characteristic causes the network element to back off from transmission.

7. A network element according to claim 6, wherein transmitter transmits the determined PCS characteristic to neighboring nodes in the wireless network.

8. A network element according to claim 6, wherein the receiver to receive the PCS characteristic from the neighboring network element comprises the receiver to receive transmission from a centralized control node that receives and distributes PCS characteristics for multiple nodes of the network.

9. A network element according to claim 6, wherein the hardware control circuitry sets the hardware PCS threshold at periodic intervals and does not alter the hardware PCS threshold setting during the interval.

10. A wireless electronic device comprising:
a wireless device hardware circuit having:
a processor to determine a hardware carrier sensing sensitivity level based at least in part on a carrier sensing level determined for the wireless electronic device based on an interference condition of a communication channel and a carrier sensing level received from a remote wireless electronic device in a network that produces interference on the communication channel, wherein the carrier sensing level determined for the wireless electronic device indicates a threshold level of interference that is tolerable for a physical layer of the wireless electronic device, where interference on the communication channel exceeding the threshold level indicated by the carrier sensing level determined for the wireless electronic device causes the wireless electronic device to back off from transmission on the communication channel, and wherein the received carrier sensing level for the remote wireless electronic device indicates a threshold level of interference that is tolerable for a physical layer of the remote wireless electronic device, where interference in the network exceeding the threshold level indicated by the received carrier sensing level for the remote wireless electronic device causes the remote wireless electronic device to back off from transmission; and
a control circuit to adjust the hardware carrier sensing sensitivity level to the determined level, where interference in the wireless network exceeding the updated PCS characteristic causes the network element to back off from transmission; and
a flash memory coupled with the chipset to store data from the processor and provide stored data to the processor.

11. A wireless electronic device according to claim 10, wherein the processor determines the carrier sensing level based at least in part on a carrier sensing threshold determined from a signal to noise ratio (SNR) for the communication channel for the wireless electronic device.

12. A wireless electronic device according to claim 10, wherein the control circuit adjusts the hardware carrier sensing sensitivity level at periodic intervals.

13. A wireless electronic device according to claim 10, wherein the hardware circuit further comprises a transmission control circuit to cause a wireless transmitter on the electronic device to transmit the determined carrier sensing sensitivity level to another electronic device in the network.

14. An article of manufacture comprising a machine-accessible storage medium having content stored thereon to provide instructions to cause an electronic system to:
measure a communication channel characteristic of a wireless communication channel for a local wireless network node of a network of nodes;
determine a local transmission threshold for the local wireless network node based on the measured communication channel characteristic, wherein the local transmission threshold includes a physical carrier sense threshold indicating a threshold level of interference that is tolerable for a physical layer of the local wireless network node, where interference sensed in the network by the local wireless network node exceeding the local transmission threshold causes the local wireless network node to back off from transmission;

receive a transmission threshold from a remote network node, the received transmission threshold indicating a threshold level of interference that is tolerable for a physical layer of the remote network node, where interference sensed in the network by the remote network node exceeding the received transmission threshold causes the remote network node to back off from transmission; and adjust automatically the hardware settings of the physical layer of the local wireless network node based on the local transmission threshold and the received transmission threshold, including selecting the lower transmission threshold of the local transmission threshold and the received transmission threshold, and adjusting the hardware settings to make the wireless network node responsive to the selected transmission threshold, where interference exceeding the selected transmission threshold causes the local wireless network node to back off from transmission on the wireless communication channel.

15. An article of manufacture according to claim 14, wherein the content to provide instructions to cause the electronic device to measure the communication channel characteristic comprises the content to provide instructions to cause the electronic device to determine a signal to noise-plus-interference ratio (SNIR) for the communication channel for the local wireless network node.

16. An article of manufacture according to claim 14, wherein the content to provide instructions to cause the electronic device to determine a transmission threshold comprises the content to provide instructions to cause the electronic device to determine a physical carrier sense threshold.

17. An article of manufacture according to claim 14, further comprising the content to provide instructions to cause the electronic device to transmit the determined local transmission threshold to another node in the wireless network.

18. An article of manufacture according to claim 14, wherein the content provide instructions to cause the electronic device to adjust the hardware settings of the local wireless network node at periodic intervals.

19. An article of manufacture according to claim 14, wherein the content to provide instructions to cause the electronic device to receive the transmission threshold from the remote network node comprises the content to provide instructions to cause the electronic device to receive a transmission threshold for multiple neighboring network nodes, and wherein the content to provide instructions to cause the electronic device to adjust automatically the hardware settings of the local wireless network node based on the local transmission threshold and the received transmission threshold comprises the content to provide instructions to cause the electronic device to adjust the hardware settings of the local wireless network node based on the local transmission threshold and all received transmission thresholds.

20. An apparatus comprising:

a processor to determine a carrier sensing threshold for the apparatus based at least in part on interference associated with a communication channel of a transmission medium, including determining a physical carrier sense threshold for the apparatus indicating a threshold level of interference that is tolerable for a physical layer of the apparatus, where interference on the communication channel exceeding the threshold level causes the apparatus to back off from transmission on the communication channel, and based at least in part on a remote carrier sensing threshold of a remote wireless network device sent to the apparatus from the remote wireless network device, the remote carrier sensing threshold indicating a threshold level of interference that is tolerable for a physical layer of the remote wireless electronic device, where interference in the network exceeding the threshold level indicated by the remote carrier sensing level for the remote wireless electronic device causes the remote wireless electronic device to back off from transmission, wherein the determined carrier sensing threshold for the apparatus is selected as the lower of the physical carrier sense threshold for the apparatus and the remote carrier sense threshold for the remote wireless network device; and a control circuit to adjust the carrier sensing threshold to the determined carrier sensing threshold to cause the apparatus to be responsive to the determined carrier sensing threshold, where interference exceeding the determined carrier sensing threshold causes the apparatus to back off from transmission on the communication channel.

21. An apparatus according to claim 20, wherein the processor to determine the carrier sensing threshold based on the interference further comprises the processor to determine a signal to noise ratio (SNR) for the communication channel.

22. An apparatus according to claim 20, further comprising the processor to prepare a message having the determined carrier sensing threshold to transmit to the remote wireless network device.

23. An apparatus according to claim 20, wherein the control circuit to adjust the carrier sensing threshold comprises the hardware control circuit to adjust the carrier sensing threshold at periodic intervals.

* * * * *

UNITED STATES PATENT AND TRADEMARK OFFICE
CERTIFICATE OF CORRECTION

PATENT NO. : 7,463,644 B2
APPLICATION NO. : 10/816434
DATED : December 9, 2008
INVENTOR(S) : Zhu et al.

It is certified that error appears in the above-identified patent and that said Letters Patent is hereby corrected as shown below:

In column 11, at line 56 delete, "circuits" and insert -- circuitry --.

Signed and Sealed this

Twenty-second Day of December, 2009

David J. Kappos
*Director of the United States Patent and Trademark Office*